Patented Sept. 13, 1949

2,481,723

UNITED STATES PATENT OFFICE 2,481,723

METHOD OF PRODUCING A DRIED FOOD PRODUCT

Mayne R. Coe, Washington, D. C., assignor to Rile-Coe Filter Process, Inc., The Weirs, N. H., a corporation of Delaware No Drawing. Application March 19, 1945, Serial No. 583,639

3 Claims. (Cl. 99—204)

The present invention relates to improvements in the method of sun-drying fruits, vegetables and like commodities containing acids, sugars or both, and aims generally to improve existing methods for this purpose.

Many fruits and vegetables, for example, grapes, apricots, tomatoes as well as certain citrus fruits are dehydrated for the commercial market. I have discovered that exposing such fruits or vegetables to the sun's rays for drying purposes causes reduction or dissipation of the natural acids originally contained in the natural product, whether citrus acid or malic acid, to the end that the dried commodity is not so full-flavored as the original fruit or vegetable. Furthermore, I have discovered that by excluding certain wave lengths of light from the commodities during the sun-drying process, the acid content of the original commodity is not materially dissipated or reduced, and the drying action of the light rays is not substantially decreased.

One of the primary objects of the invention is to improve the method of sun-drying fruits, vegetables and the like whereby the loss of valuable constituents of the commodities, such as the volatile oils, acids and flavoring constituents which normally may be dissipated by the photochemical action of light, is appreciably prevented.

A further object of the invention is to improve the conventional process of sun-drying fruits, vegetables and like commodities by utilizing the wave lengths of light exclusively above 4900 Angstrom units of the spectrum.

A further object of the invention is the provision of an improved process of sun-drying fruits, vegetables and like commodities wherein the only appreciable loss to the commodity during drying is the water which is evaporated therefrom, thus retaining in the dried commodity substantially all of the other of its original constituents.

The above and further objects of the invention will be best understood by persons skilled in the art from a consideration of the following more detailed description of the process.

In the sun-drying of fruits, vegetables and the like, the commodities to be dried are usually spread upon a suitable support, for example a tray or pan, and are thus exposed to the drying effect of the full sunlight for a sufficient time to permit the evaporation of a substantial portion of the water contained in the original commodity. Most fruits and vegetables contain acids and sugar in some certain balance or ratio. To destroy either of these constituents would destroy the acid-sugar balance or ratio, rendering the dried commodity much less desirable than the one dried by the new process.

I have discovered that certain fruit and vegetable acids, such as citric acid and malic acid, are rapidly dissipated or disintegrated in readily noticeable amounts when subjected to full sunlight for periods of from four to five hours. The rapid loss of substantial amounts of these acids in such short time makes evident the inferior quality of the dried product.

According to the present invention, the fruit, vegetable or like commodity under treatment is subjected to selected wave lengths of light, preferably sunlight, above 4900 Angstrom units of the spectrum, while excluding substantially all light below 4900 A. U. to the limit of sunlight in the ultra violet region. By the term "spectrum" I preferably include wave lengths of light lying in the invisible region down to 2700 and in the visible region above 4000 A. U. as well as the invisible region above 7200 A. U. According to the method, a screen possessing the property of absorbing wave lengths of light below 4900 A. U. is interposed between the commodity under treatment and the light source.

According to one embodiment of the invention, the screen to be interposed between the commodity and the light source is of such character as to be opaque to or absorb substantially all rays of light between about 2700 A. U. and about 4900 A. U. of the spectrum while being substantially transparent to wave lengths of light above 4900 A. U. The screen need not be wholly opaque to or absorbent of light rays between 2700 A. U. and 4900 A. U. as I find that no appreciably harmful results occur, if not more than two (2) percent of such rays are transmitted. Stated another way, the percentage of transmission of wave lengths of light between 2700 A. U. and 4900 A. U. should not be more than five (5) percent, but preferably less than two (2) percent of such wave lengths. Citric acid and malic acid show substantially no dissipation or deterioration when subjected to light transmitted by the above described screen for five hours or more.

The light screen may be a sheet of any suitable material, such as paper, fabric, cellulose acetate products, glass or the like possessing the property of aborbing substantially all wave lengths of light between 2700 A. U. and 4900 A. U. and transmitting those wave lengths of light above the latter figure. Desirably the screen may be a sheet of ordinary window glass coated on one or both sides with a lacquer comprising a suitable lacquer vehicle having incorporated therein either a malachite green plus a suitable amount of fast yellow, or a fael green dye together with coumarin or other ultra violet light-excluding material in amounts equivalent to about 4 percent of the solids of the coating. It will be understood that the percentage of the green dye and coumarin will vary, depending upon the nature of the screen material, and the extent to which it absorbs the lacquer.

According to another form of the invention, the light screen used possesses the property of absorbing substantially all wave lengths of light between 2700 A. U. and 4900 A. U. as well as between 6300 A. U. and 6700 A. U. This screen has been found desirable for use where the commodity to be dried may not be wholly ripened or matured, and further ripening under the action of the transmitted rays is to be retarded. Such a screen possessing the property of absorbing at least 98 percent of the wave lengths of light between 2700 A. U. and 4000 A. U. and at least ninety-five (95) percent, but preferably more between 4000 A. U. and 4900 A. U. as well as ninety (90) percent between 6300 A. U. and 6700 A. U. but preferably more, while transmitting preferably at least twenty (20) percent of all other wave lengths of light may be produced by coating a sheet of ordinary window glass or close meshed textile fabric on one or both sides with a coating composed of—

|  | Parts |
|---|---|
| Fael green dye (American Chlorophyll Co.) | 17½ |
| Proprietary alcohol (not anhydrous) | 56½ |
| Methyl Cellosolve | 3½ |
| Orange shellac (#4 cut) | 21½ |
| Coumarin (approx. 4% of other solids) | 1 |
|  | 100 |

In the above formula the amount of coumarin may be increased as necessary to provide adequate absorption of ultra violet light rays down to 2700 A. U.

Fruit and vegetables that have been sun-dried according to the method of this invention possess noticeable improvement in flavor over similar fruit dried by full sunlight. By preventing the dissipation or disintegration of the acid constituents of the commodity the natural acid-sugar balance or ratio is more fully retained with the result that the dried product possesses more of the full flavored constituents of the original than when the fruit or vegetable is dried in the conventional way.

Obviously the invention is not to be restricted to the precise limits of the light screen as described above, as partial beneficial results are to be expected as the region of light absorption approaches those given above.

I claim:

1. The process of drying fruits and vegetables which consists in subjecting the commodities to wave lengths of light while excluding therefrom substantially all wave lengths of light below 4900 Angstrom units and between 6300 to 6700 Angstrom units of the spectrum.

2. The process of drying fruits and vegetables which consists in subjecting the commodities to those wave lengths of light only above 4900 Angstrom units of the spectrum and excluding therefrom substantially all rays of light between 2700 and 4900 Angstrom units and between 6300 and 6700 Angstrom units.

3. The method of dehydrating fruits, vegetables and the like containing fruit acids, sugar and water which consists in removing water from the commodities by subjecting them to only those wave lengths of light above 4900 Angstrom units of the spectrum and maintaining substantially the natural sugar-acid ratio in said commodity by simultaneously shielding said commodities from wave lengths of light between 2700 and 4900 Angstrom units and between 6300 and 6700 Angstrom units.

MAYNE R. COE.

REFERENCES CITED

The following references are of record in the file of this patent:

UNITED STATES PATENTS

| Number | Name | Date |
|---|---|---|
| 1,859,740 | Kennedy | May 24, 1932 |
| 1,900,072 | Quinn | Mar. 7, 1933 |
| 2,108,305 | Coe | Feb. 15, 1938 |
| 2,292,255 | Weisberg | Aug. 4, 1942 |
| 2,365,674 | Blumenkranz | Dec. 26, 1944 |